United States Patent
Zimmerman et al.

(10) Patent No.: US 9,244,281 B1
(45) Date of Patent: Jan. 26, 2016

(54) DISPLAY SYSTEM AND METHOD USING A DETACHED COMBINER

(71) Applicants: Kenneth A. Zimmerman, Sherwood, OR (US); Carlo L. Tiana, Portland, OR (US); Sarah Barber, Cedar Rapids, IA (US)

(72) Inventors: Kenneth A. Zimmerman, Sherwood, OR (US); Carlo L. Tiana, Portland, OR (US); Sarah Barber, Cedar Rapids, IA (US)

(73) Assignee: Rockwell Collins, Inc., Cedar Rapids ( * ) Notice: Subject to any disclaimer, the term of this patent is extended or adjusted under 35 U.S.C. 154(b) by 26 days.

(21) Appl. No.: 14/038,400

(22) Filed: Sep. 26, 2013

(51) Int. Cl.
G02B 27/01 (2006.01)
(52) U.S. Cl.
CPC ................................. G02B 27/0176 (2013.01)
(58) Field of Classification Search
CPC ........... G02B 27/0075; G02B 27/0189; G02B 27/1006; G02B 27/1073; G02B 27/108; G02B 27/12; G02B 27/144; G02B 27/145; G02B 27/2228; G02B 27/225; G02B 27/2278; G02B 27/24; G02B 27/283; G02B 27/4272; G02B 27/44; G02B 27/48; G02B 3/0087; G02B 5/003; G02B 5/0242; G02B 5/0257; G02B 5/0278; G02B 5/04; G02B 5/085; G02B 5/1814; G02B 5/1885; G02B 5/205; G02B 5/22; G02B 5/32; G02B 6/0018; G02B 6/0028; G02B 6/0031; G02B 6/0045; G02B 6/0055; G02B 6/4286; G02B 7/02; G02B 7/022; G02B 7/026; G02B 27/0176
USPC .......................................................... 359/630
See application file for complete search history.

(56) References Cited

U.S. PATENT DOCUMENTS

| 2,141,884 | A | | 12/1938 | Sonnefeld |
| 3,851,303 | A | * | 11/1974 | Muller .......................... 340/980 |
| 3,885,095 | A | * | 5/1975 | Wolfson et al. ................ 348/115 |
| 3,940,204 | A | | 2/1976 | Withrington |
| 4,082,432 | A | | 4/1978 | Kirschner |
| 4,099,841 | A | | 7/1978 | Ellis |
| 4,178,074 | A | | 12/1979 | Heller |
| 4,218,111 | A | | 8/1980 | Withrington et al. |
| 4,232,943 | A | | 11/1980 | Rogers |

(Continued)

FOREIGN PATENT DOCUMENTS

CN 101881936 A 11/2010
DE 10 2006 03 785 7/2007

(Continued)

OTHER PUBLICATIONS

Office Action for U.S. Appl. No. 13/250,858 Dated Feb. 19, 2014, 13 pages.

(Continued)

*Primary Examiner* — Bumsuk Won
*Assistant Examiner* — Grant Gagnon
(74) *Attorney, Agent, or Firm* — Angel Gerdzhikov; Donna Suchy; Daniel Barbieri

(57) ABSTRACT

An apparatus provides a virtual display in an environment for various applications including avionic, naval, military, remote control, medical and other applications. The apparatus can be a head up display (HUD) or head worn display (e.g., helmet mounted display (HMD) and can include image sources disposed at a respective image source position, and a combiner detached from the image sources. The combiner is movable to a respective combiner position for receiving light from a respective image source of the image sources. The combiner provides an image from the respective image source to a user.

20 Claims, 3 Drawing Sheets

(56) References Cited

U.S. PATENT DOCUMENTS

| | | |
|---|---|---|
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A * | 6/1988 | Bell et al. ................. 359/632 |
| 4,775,218 A * | 10/1988 | Wood et al. ................. 359/14 |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A * | 6/2000 | Fontaine et al. ............. 359/630 |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 * | 4/2001 | Mall et al. ................. 359/630 |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,757,105 B2 | 6/2004 | Niv et al. |
| 6,771,403 B1 | 8/2004 | Endo et al. |
| 6,776,339 B2 | 8/2004 | Piikivi |

(56) References Cited

U.S. PATENT DOCUMENTS

| | | |
|---|---|---|
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,285,903 B2 | 10/2007 | Cull et al. |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |

(56) References Cited

U.S. PATENT DOCUMENTS

| | | |
|---|---|---|
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | Mceldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,938,141 B2 | 1/2015 | Magnusson |
| 2002/0021461 A1 | 2/2002 | Ono et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0188617 A1 | 9/2004 | Devitt et al. |
| 2004/0208446 A1 | 10/2004 | Bond et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2007/0019152 A1 | 1/2007 | Caputo et al. |
| 2007/0019297 A1* | 1/2007 | Stewart et al. ............... 359/630 |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1* | 5/2009 | Hoffman et al. ............... 359/630 |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |

(56) References Cited

U.S. PATENT DOCUMENTS

| | | |
|---|---|---|
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |

FOREIGN PATENT DOCUMENTS

| | | |
|---|---|---|
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| WO | WO-99/52002 | 10/1999 |
| WO | WO-03/081320 A1 | 10/2003 |
| WO | WO-2006/002870 | 1/2006 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Final Office Action on U.S. Appl. No. 13/250,940 Dated Oct. 17, 2014, 15 pages.
Irie, Masahiro, Photochromic diarylethenes for photonic devices, Pure and Applied Chemistry, 1996, pp. 1367-1371, vol. 68, No. 7, IUPAC.
Non-Final Office Action on U.S. Appl. No. 13/864,991 Dated Oct. 22, 2014, 16 pages.
Office Action on U.S. Appl. No. 13/892,026 Dated Dec. 8, 2014, 19 pages.
Office Action on U.S. Appl. No. 13/892,057 Dated Nov. 28, 2014, 17 pages.
Plastic has replaced glass in photochromic lens, www.plastemart.com, 2003, 1 page.
Webster's Third New International Dictionary 433 (1986), 3 pages.
Ayras et al., Exit Pupil Expander with a Large Field of View Based on Diffractive Optics, Journal of the SID, 2009, 6 pages.
Cameron, A., The Application of Holographic Optical Waveguide Technology to Q-Sight Family of Helmet Mounted Displays, Proc. of SPIE, vol. 7326, 73260H-1, 2009, 11 pages.
Notice of Allowance for U.S. Appl. No. 12/700,557, mail date Oct. 22, 2013, 9 pages.
Office Action for U.S. Appl. No. 12/700,557, mail date Aug. 9, 2013, 12 pages.
Office Action for U.S. Appl. No. 12/700,557, mail date Feb. 4, 2013, 11 pages.
Office Action for U.S. Appl. No. 13/250,621, mail date May 21, 2013, 10 pages.
Office Action for U.S. Appl. No. 13/250,858, mail date Oct. 28, 2013, 9 pages.
Office Action for U.S. Appl. No. 13/250,940, mail date Aug. 28, 2013, 10 pages.
Office Action for U.S. Appl. No. 13/250,940, mail date Aug. 28, 2013, 15 pages.
Office Action for U.S. Appl. No. 13/250,940, mail date Mar. 12, 2013, 11 pages.
Office Action for U.S. Appl. No. 13/250,970, mail date Jul. 30, 2013, 4 pages.
Office Action for U.S. Appl. No. 13/250,994, mail date Sep. 16, 2013, 11 pages.
Wisely, P.L., Head up and head mounted display performance improvements through advanced techniques in the manipulation of light, Proc. of SPIE vol. 7327, 732706-1, 2009, 10 pages.
Office Action on U.S. Appl. No. 13/250,940 Dated Mar. 25, 2014, 12 pages.
Office Action on U.S. Appl. No. 13/251,087 Dated Mar. 28, 2014, 12 pages.
Non-Final Office Action on U.S. Appl. No. 13/250,858 Dated Sep. 15, 2014, 16 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/892,026 Dated Apr. 3, 2015, 17 pages.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Levola, et al., "Replicated slanted gratings with a high refractive index material for in and outcoupling of light" Optics Express, vol. 15, Issue 5, pp. 2067-2074 (2007).

(56) References Cited

OTHER PUBLICATIONS

Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 pages.
Non-Final Office Action on U.S. Appl. No. 13/844,456 Apr. 1, 2015, XX Pages.
Non-Final Office Action on U.S. Appl. No. 13/869,866 Dated May 28, 2014, 16 pages.
Non-Final Office Action on U.S. Appl. No. 14/044,676 Dated Apr. 9, 2015, 13 pages.
Non-Final Office Action on U.S. Appl. No. 14/225,062 Dated May 21, 2015, 11 pages.
Nordin, G., et al., Journal of the Optical Society of America A., vol. 9, No. 12, Dec. 1992, pp. 2206-2217, 12 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Non-Final Office Action on U.S. Appl. No. 13/250,858 dated Jun. 12, 2015, 20 pages.
Final Office Action on U.S. Appl. No. 13/250,858 Dated Feb. 4, 2015, 18 pages.
Final Office Action on U.S. Appl. No. 13/892,057 Dated Mar. 5, 2015, 21 pages.
First office action received in Chinese patent application No. 201380001530.1, dated Jun. 30, 2015, 9 pages with English translation.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 Dated Jul. 14, 2015, 32 pages.

* cited by examiner

DISPLAY SYSTEM AND METHOD USING A DETACHED COMBINER

CROSS REFERENCE TO RELATED APPLICATIONS

The present application is related to: U.S. patent application Ser. No. 12/700,557, entitled, "Worn Display System and Method Without Requiring Real Time Tracking For Bore-Sight Precision," filed on Feb. 4, 2010, incorporated herein by reference in its entirety, and assigned to the assignee of the present application, U.S. patent application Ser. No. 13/250,621, entitled, "System For and Method of Catadioptric Collimation In a Compact Head Up Display (HUD)," filed on Sep. 30, 2011, incorporated herein by reference in its entirety and assigned to the assignee of the present application, U.S. patent application Ser. No. 13/250,940, entitled, "Head Up Display (HUD) Utilizing Diffractive Gratings Having Graded Efficiency," filed on Sep. 30, 2011, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on Sep. 30, 2011, incorporated herein by reference in its entirety, and assigned to the assignee of the present application; U.S. patent application Ser. No. 13/251,087, entitled, "System for and Method of Extending Vertical Field of View in Head Up Display Utilizing a Waveguide Combiner," filed on Sep. 30, 2011, incorporated herein by reference in its entirety, and assigned to the assignee of the present application; U.S. patent application Ser. No. 13/250,970, entitled, "System For and Method of Stowing HUD Combiners," filed on Sep. 30, 2011 and assigned to the assignee of the present application, incorporated herein by reference in its entirety; and U.S. patent application Ser. No. 13/250,994, entitled, "Compact Head Up Display (HUD) for Cockpits with Constrained Space Envelopes," filed on Sep. 30, 2011, incorporated herein by reference herein in its entirety and assigned to the assignee of the present application.

BACKGROUND

The present specification relates generally to the field of displays. More specifically, the specification relates to virtual displays.

Virtual displays can provide information that is viewable in virtual space for a user of equipment, such as aircraft, ships, boats, naval craft, medical equipment, robotic equipment, remote vehicles, unmanned vehicle systems (UVSs), training simulators, entertainment systems, military equipment, land vehicles, etc. The information can include navigation parameters, guidance parameters, equipment parameters, location information, video information, remote views, symbology, etc.

Virtual displays can utilize Head Mounted Displays (HMDs) (e.g., helmet mounted displays and head worn displays) to provide images to an operator or user (e.g., a pilot in a cockpit). In aircraft applications, HMDs generally include visors, combiners, optical projection elements, an image source, and a head orientation sensor. The image source provides an image which is projected to a combiner to provide a collimated image to the pilot. The image can include enhanced vision images, targeting data, flight instrument data, synthetic vision images, head up display (HUD) data, etc.

Conventional HMDs and HUDs require bore sight accuracy. Conventional HUDs typically position the combiner and the projector for bore sight accuracy at installation. The conventional HUDs require a fixed combiner and projector, each being fixed to a single calibrated position in the cockpit. HMDs, such as those used on modern fighters, use a complex head orientation sensor to coordinate the image provided to the pilot with respect to the view within and outside the cockpit. However, complex orientation sensors are expensive, tolerance limited, bulky, require calibration, and can be inaccurate.

HMDs and HUDs have used wave guides with diffraction gratings. The gratings can be switchable Bragg gratings. Certain HMD and HUD systems (such as those described in the applications incorporated herein by reference) use an optical waveguide configured as a flat plat glass with diffraction gratings. The flat plate of glass serves as a waveguide and a combiner. Light from a single LED illuminated LCD micro display is collimated and provided in the forward field of view of the pilot as an expanded view of the image on the micro display. Generally, the expanded view image is limited to the information provided on the single micro display.

Thus, there is a need for a low cost, lightweight virtual display system capable of displaying images from more than one image source. There is also a need for a multiple display virtual display system. There is further a need for HUD or HMD system and method that can be easily integrated in the design of a cockpit without requiring extra display space. There is further a need for a HUD or HMD that can provide multiple sources of information on a combiner. There is also a need for a virtual display system and method that is optimized for providing different types of information suitable for use in a cockpit environment. Yet further, there is a need for an HMD or HUD system that displays types of information in positions that are appropriate for the particular type of information. Further still, there is a need for an HMD which does not require head tracking.

Accordingly, it would be desirable to provide a display system and/or method that provides one or more of these or other advantageous features. Other features or advantages will be made apparent in the present specification. The teachings disclosed extend to those embodiments which fall within the scope of the appended claims, regardless of whether they accomplish one or more of the aforementioned advantages or features.

SUMMARY

An exemplary embodiment relates to apparatus that provides a virtual display in an environment for various applications including avionic, naval, military, remote control, medical and other applications. The apparatus can be a head up display (HUD) or head worn display (e.g., helmet mounted display (HMD)) and can include image sources, each disposed at a respective image source position, and a combiner detached from the image sources. The combiner is movable to a respective combiner position for receiving light from a respective image source of the image sources. The combiner provides an image from the respective image source to a user.

Another embodiment relates to an apparatus for providing a virtual display in an environment. The apparatus includes image sources, each being disposed at a respective image source position. The apparatus also includes a combiner detached from the image sources and movable to a respective combiner position for receiving light from a respective image source of the image sources. The combiner provides an image from the respective image source to a user.

Another exemplary embodiment relates to a method of providing a virtual display in an environment. The method includes positioning a combiner at one of at least two positions, the two positions being a first position for receiving collimated light from a first image source and a second position for receiving collimated light from a second image source. The method also includes providing a virtual image to eyes. The virtual image includes a first image from the first image source or a second image from a second image source. The combiner is physically detached from the first image source and the second image source.

Another embodiment relates to an apparatus for providing an optical display. The apparatus includes means for receiving an image from one of two or more image sources and providing the image to eyes, and means for positioning the means for receiving at one of a first position associated with a first image source of the images sources or a second position associated with a second image sources of the second image sources.

BRIEF DESCRIPTION OF THE DRAWINGS

These and other features, aspects, and advantages of the present invention will become apparent from the following description, appended claims, and the accompanying exemplary embodiments shown in the drawings, wherein like numerals denote like elements, which are briefly described below:

DETAILED DESCRIPTION

Figure 1:
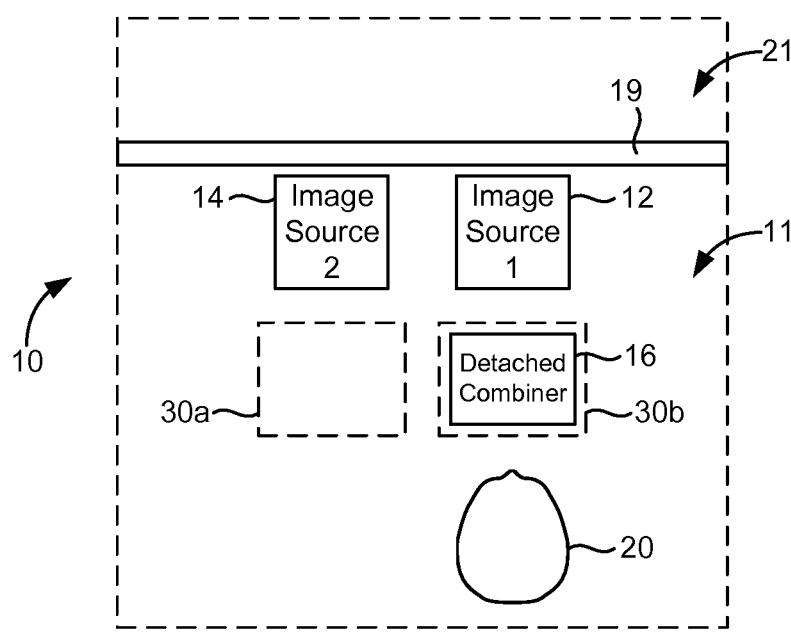
FIG. 1 is a schematic general block diagram of a virtual display system including a detached combiner in accordance with an exemplary embodiment.

Before describing in detail the particular improved system and method, it should be observed that the invention includes, but is not limited to, a novel structural combination of components and not in the particular detailed configurations thereof. Accordingly, the structure, software, optics, methods, functions, control and arrangement of components have been illustrated in the drawings by readily understandable block representations and schematic drawings in order not to obscure the disclosure with structural details which will be readily available to those of ordinary skill in the art having the benefit of the description herein. Further, the invention is not limited to the particular embodiments depicted in the exemplary diagrams, but should be construed in accordance with the language of the claims.

With reference to FIG. 1, a virtual display system 10 provides a virtual image at one or more locations in an environment 11. System 10 can be part of a head up display (HUD) system, a head worn display system, a helmet mounted display (HMD) system, or other worn display system. Virtual display system 10 can be utilized in various applications, including but not limited to aviation, medical, naval, targeting, ground-based vehicle, military, remote control, etc. In one embodiment, virtual display system 10 is configured for use in smaller cockpit embodiments, for use in remote vehicle or aircraft applications, for use in ships or boats, or for use in simulators or other training devices. System 10 can be utilized for two dimensional or three dimensional virtual images.

In one embodiment, virtual display system 10 is utilized in an operational system or a training system to observe and control aircraft or vehicle operation. Virtual system 10 is disposed in environment 11 which can be a cockpit, bridge, operating room, etc. Environment 11 can have a window 19 or port to an environment 21 external to environment 11 in one embodiment. For example, environment 11 can be an aircraft cockpit, and environment 12 can be the real world viewable through the windshield of the cockpit.

Virtual display system 10 includes two or more image sources 12 and 14 in one embodiment. Image sources 12 and 14 are positioned at respective positions within environment 11. Display system 10 also includes a combiner 16. Combiner 16 is movable into one or more positions corresponding to the positions of image sources 12 and 14 in one embodiment. In one embodiment, combiner 16 can be positioned in a position 30A associated with image source 14 and a position 30B associated with image source 12. In another embodiment, combiner 16 is movable by changing its angle of view from a view of source 12 to a view of source 14 or vice versa. In an embodiment in which combiner 16 is worn on the head, the position of combiner 16 can be changed by turning the head to view image source 12 or image source 14.

A user 20 can view information from image source 12 when combiner 16 is positioned at position 30B and can view information from image source 14 when combiner 16 is positioned at position 30A. Alternatively, a user 20 can view information from image source 12 when the view through combiner 16 points toward source 12 and can view information from image source 14 when the view through combiner 16 points toward image source 14. Image sources 12 and 14 can be a variety of optical devices for providing light to combiner 16. Image sources 12 and 14 can be embodied as projectors for providing collimated light to combiner 16.

Combiner 16 can be embodied as a head worn combiner or a HUD combiner. In one embodiment, combiner 16 utilizes wave guide optics and diffraction gratings to receive collimated light provided by sources 12 and 14 and provide collimated light to a user 20. Therefore, system 10 can take advantage of the optical nature of wave guide technology to overlay symbology conforming on the viewed outside scene without dependence on the position of combiner 16 but only on the location of image sources 12 and 14 according to one embodiment. Therefore, combiner 16 is physically detached from image sources 12 and 14 and not in a fixed location relative to the aircraft bore sight according to one embodiment.

Advantageously, system 10 can take advantage of periscopic effects so that rays of light entering combiner 16 are parallel and in a reverse direction to rays of light entering combiner 16 from one of image sources 12 and 14 according to one embodiment. In one embodiment, combiner 16 is entirely passive and insensitive to movement in all six degrees of freedom according to one embodiment. In this way, system 10 does not require head tracking equipment and/or electric connectivity between combiner 16 and other parts of environment 11 according to one embodiment. Alternatively, head tracking equipment and electrical connectivity can be used with system 10.

Image sources 12 and 14 can be or include any type of devices for providing an image including but not limited to a CRT display, an LED display, an active matrix liquid crystal display (LCD), a light emitting diode, laser illuminator, etc. In a preferred embodiment, image sources 12 and 14 include a micro LCD assembly or liquid crystal on silicon (LCOS) display and can provide linearly polarized light. Image sources 12 and 14 can include a laser or LED backlight.

Image sources 12 and 14 can also include collimating optics which can be a single optical component, such as a lens, or include multiple optical components. The collimating optics can be integrated with each of image sources 12 and 14 in one embodiment. The collimating optics can also be separate or partially separate from image sources 12 and 14.

In operation, display system 10 provides images from one of sources image source 12 and 14 to a pilot or other operator so that he or she can simultaneously view the images and a real world scene in one embodiment. The images can include graphic and/or text information (e.g., flight path vector, target icons, symbols, fuel indicators, course deviation indicator, pitch indicator, etc.). The image can also include information from other sensors or equipment associated with environment 10 (e.g., a vertical traffic collision avoidance display, terrain avoidance and awareness display, a weather radar display, flight control sensors, an electronic flight bag, a navigation system, environmental sensors, etc. in an aircraft) in one embodiment. In addition, the images can include synthetic or enhanced vision images. In one embodiment, collimated light representing the image from image source 12 is provided on combiner 16 so that the pilot can view the image conformally on the real world scene through combiner 16. In one embodiment, the image from image source 14 is an image associated with navigation or electronic flight bags and does not require conformal presentation with a real world scene.

Image sources 12 and 14 can provide information from a variety of sources. In one embodiment, image sources 12 and 14 can provide information from aircraft sensors, instruments, and systems including but not limited to one or more of a targeting computer, a HUD computer, a synthetic vision system (SVS), an enhanced vision system (EVS), a flight computer, a navigation system, an electronic flight bag system and a virtual displays system.

Figure 2:
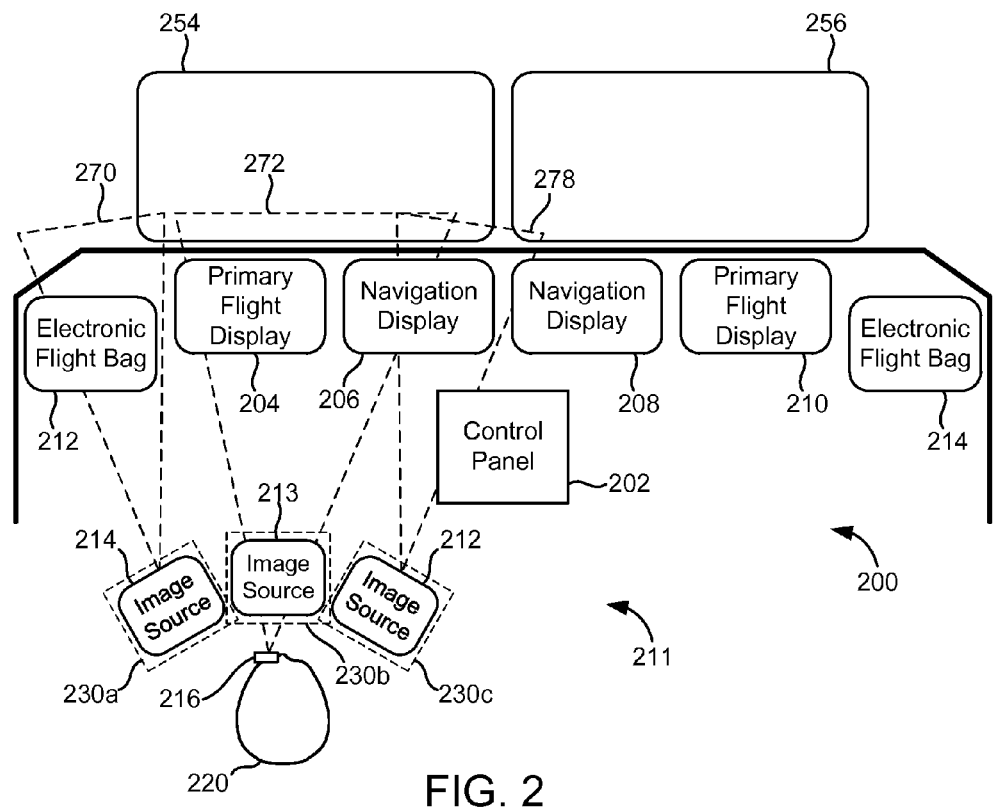
FIG. 2 is a more detailed block diagram of a head worn virtual display system including a detached combiner in accordance with another exemplary embodiment.

With reference to FIG. 2, a display system 200 similar to display system 10 includes a combiner 216, and image sources 212, 213 and 214. A pilot 220 can wear combiner 216 which can be a binocular combiner or a monocular combiner. Combiner 216 is preferably a waveguide combiner with a diffractive grating input and a diffractive grating output. Combiner 216 can be integrated with or attached to a helmet, glasses, a head band, hat, etc. according to various embodiments.

System 200 is employed in an aircraft environment 211 or a cockpit including a window 254 and a window 256 in one embodiment. In addition, environment 211 can include a control panel 202, a primary flight display 204, a navigation display 206, a navigation display 208, a primary flight display 210, an electronic flight bag 212 and electronic flight bag 214. Primary flight display 210, a navigation display 208, and electronic flight bag 214 can be redundant systems provided for a co-pilot, as shown in FIG. 2 according to one embodiment.

In operation, when the pilot's view is positioned in front of image source 213 at position 230B, the pilot receives primary flight display information or symbology associated with primary flight display 204 on combiner 216. A HUD computer can provide the data for the image on source 213 in one embodiment. In one embodiment, the primary flight symbology is conformal with the outside environment viewed by the pilot through window 254 (e.g., center image source 213 is aligned with the view through window 254). Pilot 220 can turn or rotate head position to view information on combiner 216 associated with image source 214 at position 230A. Image source 214 can be configured to provide electronic flight bag information associated with an electronic flight bag display 212. Pilot 220 can turn or rotate head position to view information on combiner 216 associated with image source 212 at position 230C. Image source 212 can be configured to provide navigation information associated with navigation display 212.

A field of view 272 through combiner 216 for the information on image source 213 includes window 254. A field of view 270 of combiner 216 for information on image source 214 includes only a small portion of window 254 in one embodiment. A view through window 254 is generally not necessary when viewing electronic flight bag information. Field of view 270 including image source 214 can be positioned below a glare shield in one embodiment. A field of view 278 of combiner 216 for the information on image source 212 can be above the glare shield and include portions of windows 254 and 256.

Although only three image sources 212, 213, and 214 and fields of view 270, 272, and 278 are shown in FIG. 2, more image sources and fields of view can be provided. Advantageously, pilot 220 can obtain information from three different systems simply by rotating head position to the appropriate position associated with the appropriate information. As shown in the embodiment in FIG. 2, rotating the head position to the left results in receiving electronic flight bag information on combiner 216, and rotating the head position to the right allows pilot 220 to view navigation information.

In one embodiment, image source 212 is positioned at a position 230C, which is below the positions associated with positions 230A and 230B. With such a position, by looking downward, pilot 220 can receive the information associated with image source 212. In such an embodiment, the image source 212 provides information that need not be conformal with views outside of windows 254 and 256.

In one embodiment, combiner 216 can be movable along the pilot's head. For example, the pilot can have a left-eye view associated with position 230B and a right-eye view associated with position 230C. In this way, the pilot can select which information is received by combiner 216. For example, when performing electronic flight bag tests, combiner 216 can be positioned in front of an eye associated with image source 214 and when in flight, combiner 216 can be positioned in front of an eye associated with image source 213 and primary flight data. Alternatively, a combiner 216 is binocular combiner or is provided only in front of one eye.

Figure 3:
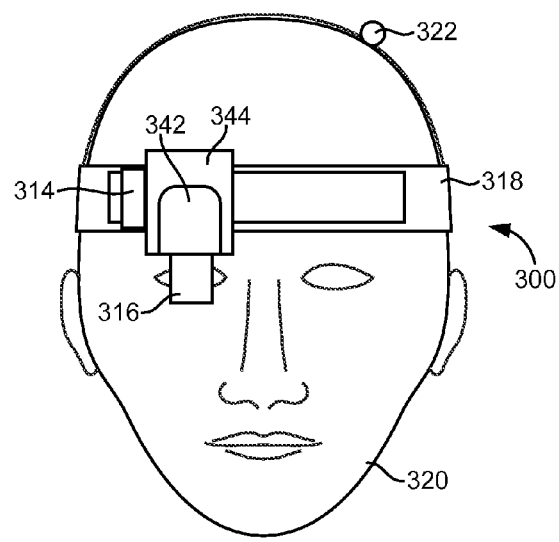
FIG. 3 is a front view schematic illustration an exemplary head worn detached combiner for use in the system illustrated in FIG. 2 in accordance with another exemplary embodiment.

With reference to FIG. 3, a combiner system 300 can be utilized in systems 10 and 200. Combiner system 300 includes a combiner 316 and a band 318 worn by pilot 320. An alignment sensor 322 can be provided on a portion of band 314. Combiner 316 can be movable via a clip 314 on band 318. Light from image sources can be received at a front face 342 of combiner 316 or a slanted top surface 344. A diffraction grating can be provided on face 342 or surface 344 to inject light into the body of combiner 316, and a diffraction grating can eject light toward the eye of pilot 320.

Figure 4:
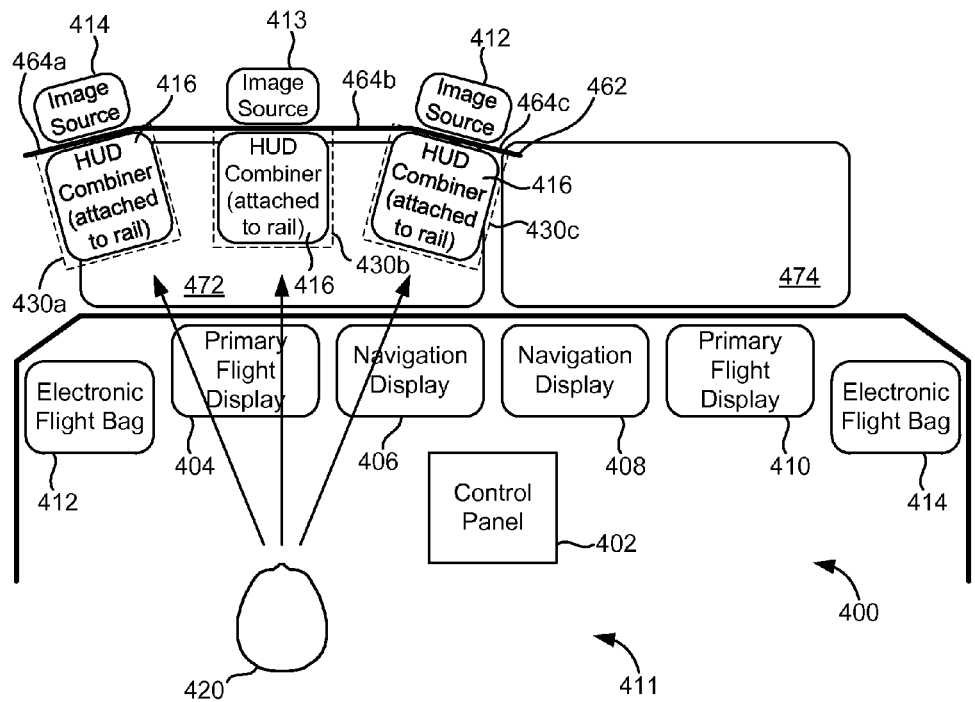
FIG. 4 is a more detailed block diagram of a head up display system including a detached combiner in accordance with another exemplary embodiment.

With reference to FIG. 4, a display system 400, similar to display system 10, is configured for use in a cockpit environment 411. Display system includes a HUD combiner 416 and image sources 412, 414 and 416. Combiner 416 is movable to position 430A associated with image source 414, position 430B associated with image source 413 and position 430C associated with image source 412. Combiner 416 is attachable to a rail 462.

Rail 462 can be a three segment rail including segments 464A, 464B and 464C in one embodiment. Rail 462 can be configured in accordance with a cockpit configuration associated with a window 472 and a window 474. Rail 462 allows combiner 416 to align with eyes of pilot 420 when it is positioned outside of center position 430B (e.g., in positions 430A and 430C.). Environment 411 includes electronic flight bag system 412, control panel 402, primary flight display 404, navigation display 406, navigation display 408, primary flight display 410 and electronic flight bag system 414. Combiner 416 is preferably slidable along rail 416 to each of positions 430A, 430B, and 430C. In one embodiment, a detente mechanism or clamp mechanism can be utilized to lock combiner 416 into one of positions 430A, 430B and 430C along rail 462.

At position 430A, combiner 416 provides electronic flight bag information from image source 414. When positioned at position 430B, combiner 416 provides primary flight display information associated with source 413 conformally viewed through window 472. When combiner 416 is positioned at position 430C, combiner 416 provides navigation information from image source 412 to pilot 420. Advantageously, display system 400 is a HUD that can present the same information as viewed from the flight deck of a primary flight display (e.g., display 404) with symbols displayed conformally as appropriate to an outside scene through window 472 according to one embodiment. Fields of view for positions 430A, 430B, and 430C can be similar to the fields of view 270, 272, and 278 discussed with reference to FIG. 2. In one embodiment, the fields of view associated with positions 430A, 430B, and 430C are vertically similar.

Figure 5:
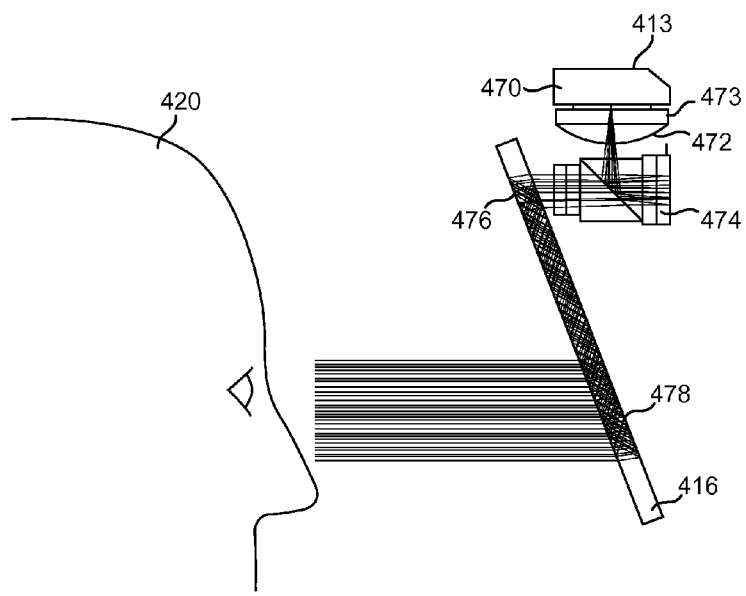
FIG. 5 is a side view schematic illustration of an exemplary image source and detached combiner for the virtual display system illustrated in FIG. 4 in accordance with another exemplary embodiment.

With reference to FIG. 5, image source 413 includes a backlit liquid crystal display module 470 including a transmissive AMLCD display 473. A very compact optical system 474 receives light from lens 472 and provides collimated light to combiner 416 (e.g., collimation via a catadioptric folded collimator in one embodiment). Generally, the collimated light input to combiner 416 has a small dimension in a vertical direction allowing a compact design. Combiner 416 includes a diffractive grating 476 for coupling light into the waveguide associated with combiner 416 and a diffractive grating 478 that ejects light out of combiner 416 to pilot 420. Gratings 476 and 478 are configured for pupil expansion The image sources 412 and 414 can be similar to image source 413 discussed above with reference to FIG. 5. Sources 412, 413 and 414 can be attached to a ceiling of the cockpit in one embodiment.

While the detailed drawings, specific examples, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the communications devices. For example, the type of system components and their interconnections may differ. The systems and methods depicted and described are not limited to the precise details and conditions disclosed. The figures show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for providing a virtual display in an environment, the apparatus comprising:
   a plurality of image sources, the image sources each being disposed at a respective image source position, the image sources comprising a first image source comprising a first projector and a second image source comprising a second projector; and
   a combiner detached from the image sources and movable to a first combiner position for receiving a first image from the first projector and a second combiner position for receiving a second from the second projector, wherein the combiner provides the first image or the second image to a single user based upon the combiner being in the first combiner position and the second combiner position.

2. The apparatus of claim 1, wherein the first image is comprised of primarily flight data and the combiner receives light from a real world scene.

3. The apparatus of claim 1, further comprising a third image source comprising a third projector disposed at a third respective position, and wherein the combiner is movable to a third respective combiner position for receiving light from the third image source.

4. The apparatus of claim 1, wherein the combiner is part of a head worn display.

5. The apparatus of claim 1, wherein the combiner is not worn by the pilot.

6. The apparatus of claim 1, wherein the image sources are disposed in a ceiling of an aircraft.

7. The apparatus of claim 1, wherein respective collimating optics are disposed with each image source.

8. The apparatus of claim 1, wherein at least one image source provides an enhanced vision image, the enhanced vision image being presented conformally with a real world scene through a window of a cockpit.

9. The apparatus of claim 1, respective combiner positions are provided on a band provided about a head of a user.

10. The apparatus of claim 1, wherein at least one image source provides a synthetic vision image, the synthetic image being presented conformally with a real world scene through a window of a cockpit.

11. The apparatus of claim 10, wherein the image sources are disposed on a rail in the cockpit.

12. The apparatus of claim 1, wherein one of the respective combiner positions is associated with a center view in the cockpit and provides primary flight data or targeting data.

13. The apparatus of claim 12, wherein one of the respective combiner positions is associated with a non-center view in the cockpit and provides electronic flight bag data or navigation data, the non-center view not including a view through a cockpit window for the single user and the center view including a view through the cockpit window for the single user.

14. A method of providing a virtual display in an environment, the method comprising:
   positioning a combiner at a first position of at least two positions, the first position for receiving light from a first image source comprising a first projector;
   providing a first virtual image to at least one eye, the first virtual image including a first image from the first projector of the first image source associated with parameters of the environment;

positioning the combiner at a second position of the two positions, the second position for receiving light from a second image source comprising a second projector; and providing a second virtual image to the at least one eye, the second virtual image including a second image from the second projector of the second image source, wherein the combiner is physically detached from the first image source and the second image source and physically movable between the first position and the second position.

15. The method of claim 14, wherein the first virtual image is a primary flight display image provided at a window position so that the virtual image conforms to a real world scene.

16. The method of claim 14, wherein combiner is positioned on a head band.

17. The method of claim 14, wherein the combiner is positioned on a rail above a glare shield in a cockpit.

18. The method of claim 17, wherein the rail has three non-parallel segments comprising a first end segment and a second end segment inclined toward the user with respect to a middle segment, wherein the middle segment is associated with the first position and one of the first and second end segments is associated with the second position.

19. An apparatus for providing an optical display, the apparatus comprising:

means for receiving an image from one of two or more image sources and providing the image to eyes, wherein the means for receiving comprising a single combiner; and means for physically positioning the single combiner of the means for receiving at a first position associated with a first image source of the images and at a second position associated with a second image source of the second image sources, wherein the first image source comprises a first projector providing a first image and the second image source provides a second image, wherein the single combiner receives the first image provided by the first projector when positioned at the first position and receives the second image provided on the second projector when positioned at the first second position, wherein the single combiner is movable to the first position and the second position during flight of an aircraft.

20. The apparatus of claim 19, wherein the apparatus comprises a head worn or head up display.

* * * * *